(12) United States Patent
Culbert et al.

(10) Patent No.: US 8,836,502 B2
(45) Date of Patent: Sep. 16, 2014

(54) PERSONAL MEDIA DEVICE INPUT AND OUTPUT CONTROL BASED ON ASSOCIATED CONDITIONS

(75) Inventors: Michael Culbert, Monte Sereno, CA (US); David John Tupman, San Francisco, CA (US); Daniel Shawn Keen, Cupertino, CA (US); Anthony Joseph Guetta, Palo Alto, CA (US); Ryan Jeffrey Du Bois, Sunnyvale, CA (US); Victor M. Tiscareno, Issaquah, WA (US); David Harrington, Morgan Hill, CA (US); Stephen John Chick, Mountain View, CA (US); Jahan Minoo, San Francisco, CA (US); Jay Steven Laefer, Sunnyvale, CA (US); Kevin Saul, Los Gatos, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1774 days.

(21) Appl. No.: 12/005,817

(22) Filed: Dec. 28, 2007

(65) Prior Publication Data

US 2009/0167542 A1 Jul. 2, 2009

(51) Int. Cl.
| | |
|---|---|
| G08B 1/08 | (2006.01) |
| G08B 21/00 | (2006.01) |
| H04M 1/00 | (2006.01) |
| H04M 3/42 | (2006.01) |
| H04W 24/00 | (2009.01) |
| H04B 1/18 | (2006.01) |
| H04J 7/02 | (2006.01) |
| H04M 1/725 | (2006.01) |

(52) U.S. Cl.
CPC ...... *H04M 1/72569* (2013.01); *H04M 1/72566* (2013.01); *H04M 1/72572* (2013.01); *H04M 2250/12* (2013.01)
USPC ...... 340/539.22; 340/635; 455/567; 455/415; 455/456.1; 455/177.1; 379/392.01; 370/498

(58) Field of Classification Search
USPC .......... 340/539.22, 635; 455/567; 379/392.01
See application file for complete search history.

(56) References Cited

U.S. PATENT DOCUMENTS

| | | |
|---|---|---|
| 4,805,210 A | 2/1989 | Griffith, Jr. |
| 5,432,844 A | 7/1995 | Core et al. |
| 5,608,786 A | 3/1997 | Gordon et al. |
| 5,615,213 A | 3/1997 | Griefer |
| 5,794,218 A | 8/1998 | Jennings et al. |
| 5,937,040 A | 8/1999 | Wrede et al. |
| 5,999,599 A | 12/1999 | Shaffer et al. |
| 6,044,081 A | 3/2000 | Bell et al. |
| 6,259,405 B1 | 7/2001 | Stewart et al. |
| 6,271,264 B1 | 8/2001 | Dhal et al. |
| 6,438,600 B1 | 8/2002 | Greenfield et al. |
| 6,526,293 B1 | 2/2003 | Matsuo et al. |
| 6,545,596 B1 | 4/2003 | Moon |
| 6,564,261 B1 | 5/2003 | Gudjonsson et al. |
| 6,587,680 B1 | 7/2003 | Ala-Laurila et al. |
| 6,643,774 B1 | 11/2003 | McGarvey |
| 6,654,455 B1 | 11/2003 | Isaka et al. |
| 6,766,176 B1 | 7/2004 | Gupta et al. |
| 6,769,000 B1 | 7/2004 | Akhtar et al. |
| 6,798,874 B1 | 9/2004 | Ohlinger et al. |

(Continued)

*Primary Examiner* — Jack K Wang
(74) *Attorney, Agent, or Firm* — Blakely, Sokoloff, Taylor & Zafman LLP

(57) ABSTRACT

Systems and methods are provided for a media device that controls input and output characteristics based on one or more associated conditions.

20 Claims, 14 Drawing Sheets

(56) References Cited

U.S. PATENT DOCUMENTS

| | | | |
|---|---|---|---|
| 6,816,469 B1 | 11/2004 | Kung et al. | |
| 6,839,761 B2 | 1/2005 | Kadyk et al. | |
| 6,847,715 B1 | 1/2005 | Swartz | |
| 6,870,835 B1 | 3/2005 | Chen et al. | |
| 6,876,734 B1 | 4/2005 | Summers et al. | |
| 6,905,414 B2 | 6/2005 | Danieli et al. | |
| 6,907,123 B1 | 6/2005 | Schier | |
| 6,912,275 B1 | 6/2005 | Kaplan | |
| 6,917,672 B2 | 7/2005 | Brown et al. | |
| 6,918,034 B1 | 7/2005 | Sengodan et al. | |
| 6,931,001 B2 | 8/2005 | Deng | |
| 6,934,858 B2 | 8/2005 | Woodhill | |
| 6,947,417 B2 | 9/2005 | Laursen et al. | |
| 6,968,216 B1* | 11/2005 | Chen et al. | 455/567 |
| 6,985,745 B2 | 1/2006 | Quaid et al. | |
| 6,987,744 B2 | 1/2006 | Harrington et al. | |
| 7,353,047 B2* | 4/2008 | Boyd | 455/567 |
| 7,392,066 B2* | 6/2008 | Haparnas | 455/567 |
| 2002/0010008 A1 | 1/2002 | Bork et al. | |
| 2002/0068537 A1 | 6/2002 | Shim et al. | |
| 2002/0086680 A1 | 7/2002 | Hunzinger | |
| 2002/0178228 A1 | 11/2002 | Goldberg | |
| 2002/0198004 A1 | 12/2002 | Heie et al. | |
| 2003/0061496 A1 | 3/2003 | Ananda | |
| 2004/0043758 A1* | 3/2004 | Sorvari et al. | 455/414.1 |
| 2004/0248586 A1 | 12/2004 | Patel et al. | |
| 2005/0157708 A1 | 7/2005 | Chun | |
| 2005/0177622 A1 | 8/2005 | Spielman et al. | |
| 2005/0272413 A1 | 12/2005 | Bourne | |
| 2006/0034336 A1 | 2/2006 | Huh et al. | |
| 2006/0116175 A1 | 6/2006 | Chu | |
| 2006/0153358 A1* | 7/2006 | Zernovizky et al. | 379/392.01 |
| 2007/0037605 A1* | 2/2007 | Logan | 455/567 |
| 2008/0219672 A1* | 9/2008 | Tam et al. | 398/130 |

* cited by examiner ated conditions. The proliferation of compact portable personal media devices (e.g., portable MP3 players, portable video players, and media capable cellular telephones) has enabled users to conveniently carry and interact with such compact portable media devices during virtually any type of activity. The interaction may include accessing multimedia such as video and audio (e.g., voice and music) and sending or receiving communications via the media device. The types of activities could be personal, social, work-related, or recreational. The activities could occur under various environmental conditions, at various times or dates, in various social settings, or in various personal settings.

PERSONAL MEDIA DEVICE INPUT AND OUTPUT CONTROL BASED ON ASSOCIATED CONDITIONS

BACKGROUND

This invention relates to personal media devices and, more particularly, to controlling input and output characteristics of personal media devices based on associated conditions.

The proliferation of compact portable personal media devices (e.g., portable MP3 players, portable video players, and media capable cellular telephones) has enabled users to conveniently carry and interact with such compact portable media devices during virtually any type of activity. The interaction may include accessing multimedia such as video and audio (e.g., voice and music) and sending or receiving communications via the media device. The types of activities could be personal, social, work-related, or recreational. The activities could occur under various environmental conditions, at various times or dates, in various social settings, or in various personal settings.

One problem with existing portable media devices such as cellular telephones is that, in order to alert a user of an incoming communication, the media device typically outputs an alert that is not always appropriate for certain environmental conditions, social situations, or personal situations. For instance, a ringer volume of sufficient intensity for a quiet office environment may not have sufficient intensity for a crowded and noisy stadium. In another instance, a cellular telephone could interrupt a business meeting with a ringing alert because the user did not previously turn off the telephone or its ring setting. Accordingly, there is a need for providing a media device capable of sensing various associated conditions of its surrounding environment and adjusting characteristics of its alert feature based on such associated conditions.

Another problem with existing portable media devices is that once an alert for an incoming call is initiated, typical media devices are unable to adapt or adjust their alert characteristics in response to a subsequent change in associated conditions. Accordingly, there is a need for providing a media device capable of sensing various changes in associated conditions, e.g., surrounding environmental conditions, after an alert is initiated and adjusting or adapting a characteristic of the alert in response to such changes or events.

Another problem with existing portable media devices is that alert settings typically remain constant regardless of the time of day or day of the week. For example, the alert volume may be set at an acceptably high intensity during the day while the same intensity is too high during the night or early morning when the user may be sleeping. Accordingly, there is a need for providing a media device capable of sensing temporal conditions and adjusting a characteristic of an alert based on such temporal conditions.

A further problem with current portable media devices is that these devices are not capable of automatically or intelligently setting their alert characteristics. For instance, cellular telephone users must continuously change the alert settings of their telephones depending on their surroundings. Accordingly, there is a need for providing a media device that is capable of intelligently, automatically, and unobtrusively adjusting alert characteristics or other output/input (I/O) characteristics based on surrounding or associated conditions.

A yet further problem with existing portable media devices is that the reception or delivery of information by the media device may be adversely affected by surrounding environmental conditions. For instance, surrounding ambient noise may affect a user's ability to hear or understand the output from a speaker of the media device where the speaker volume is set at an intensity that is too low for current conditions. In another instance, the display light intensity may be set to enable viewing in outdoor daylight settings, but be too high for certain low light conditions such as in a movie theatre. Accordingly, there is a need for providing a media device capable of adjusting an input or output characteristic in response to associated conditions such as surrounding environmental conditions.

SUMMARY

The invention, in various embodiments, addresses deficiencies in the prior art by providing systems, methods and devices that enable a personal media device user to control one or more input or output characteristics, such as alert characteristics, of a personal media device in response to associated conditions of the personal media device. Associated conditions may include, without limitation, surrounding environmental conditions, temporal conditions, and/or subsequent event conditions such as user-initiated, user-responsive, and/or other event conditions.

In various aspects, the invention employs one or more environmental sensors in a media device. An environmental sensor may include, without limitation, an accelerometer, a gyroscope, a light sensor, temperature sensor, pressure sensor, an infrared (IR) sensor, proximity sensor, capacitive proximity sensor, acoustic sensor, acoustic frequency sensor, sonic or sonar sensor, radar sensor, image sensor, video sensor, global positional system (GPS) detector, RF detector, RF or acoustic doppler detector, RF triangulation detector, battery charging sensor, peripheral device detector, an event counter, and/or other like environment sensor. An event counter may count the number of times that an event has occurred, has not occurred, or should have occurred. For example, if a user fails to answer a call after several alert instances using a particular vibration pattern, a media device may change the alert to a different vibration pattern to illicit a user's attention. The media device may also include one or more temporal sensors. The temporal sensor may include, without limitation, a clock, differential clock, counter, differential counter, calendar, and/or like temporal sensor. The media device may further support user-initiated or user response inputs via a user interface or changes in the media device's position, orientation, or movement (POM). Environmental sensors that sense position, orientation, and movement may also be referred to as POM sensors. The acoustic sensor may include a microphone capable of measuring RMS signal levels associated with received sounds and/or supporting a more complicated spectral analysis of received sounds.

In one aspect, a media device includes a sensor that generates a sensor signal based on at least one environmental condition associated with the media device. The media device also includes a temporal source that generates a temporal signal associated with the media device. The media device further includes a processor that controls one or more input or output characteristics of the media device based at least in part on the sensor signal and the temporal signal.

In one configuration, the media device control includes comparing the sensor signal and temporal signal with the one or more condition vectors or condition rule sets to determine the one or more input or output characteristics of the media device. The comparing process may include employing a pattern recognition algorithm or a vector matching algorithm. In another configuration, the output characteristics include alert characteristics. The alert characteristics may include at least one of a vibration pattern, an audio pattern, a video display image, a light pattern, and a text output. An audio pattern may include, without limitation, a ringtone, song, audio file, or like audio emission.

In certain configurations, the media device includes a data store that stores one or more condition vectors or condition rule sets. A condition vector or rule set may include at least one of an environmental condition and a temporal condition. In another configuration, a condition vector also includes an event condition. An event condition may result from a user affecting at least one of the position, orientation, and movement of the media device.

In another aspect, a media device includes a plurality of sensors for generating a plurality of sensor signals respectively. Each sensor signal may be based on an associated condition of the media device. The media device may also include a processor that receives the sensor signals and applies a decision model to the received sensor signals to control one or more input or output characteristics of the media device.

The decision model may include at least one of a linear regression model, a non-linear regression model, a logistic regression model, a Bayesian network model, a Markov model, a fuzzy model, and a propensity score to select one or more input or output characteristics. The decision model may assign a weight to each of the sensor signals respectively.

In a further aspect, a media device includes an environmental sensor that senses a change in an environmental condition associated with the media device and generates a sensor signal related to the change in the environmental condition. The media device may also include an alert controller that initiates a first alert pattern, but then changes the first alert pattern to a second alert pattern in response to the sensor signal from the environmental sensor.

Various advantages and applications of controlling the input or output characteristics of a media device based on associated conditions in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
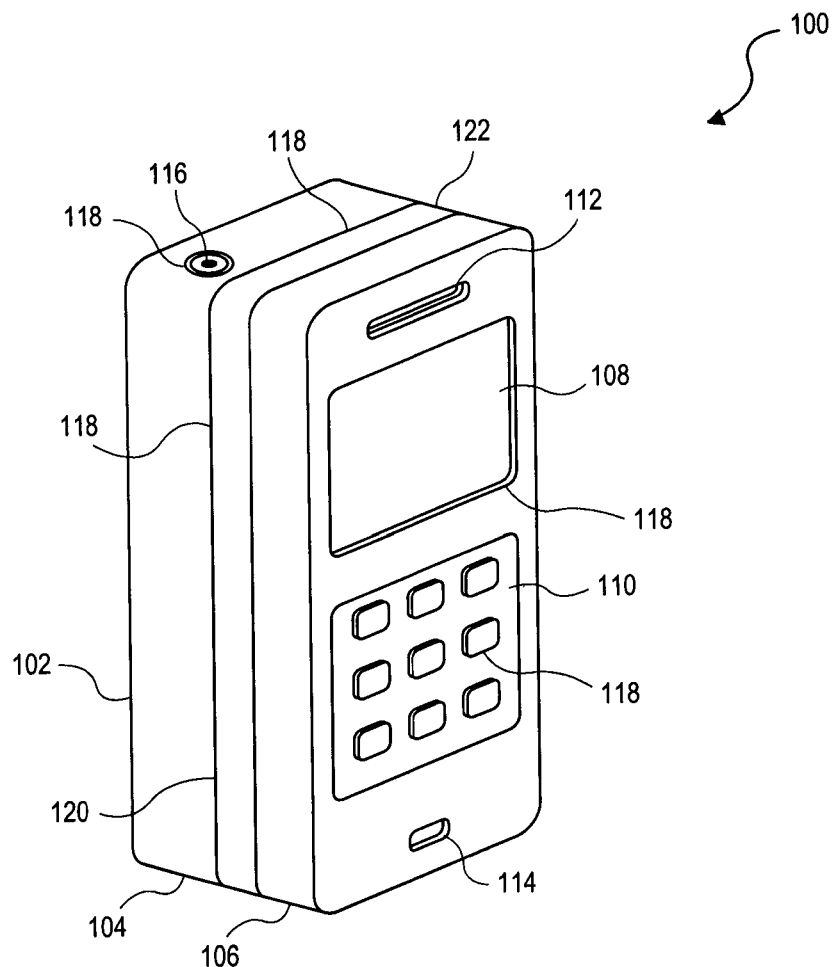
FIG. 1A is a perspective view of a media device with an exposed frame assembly according to an illustrative embodiment of the invention.

FIG. 1A is a perspective view of a media device 100 according to an illustrative embodiment of the invention. The media device 100 includes a housing 102, a first housing portion 104, a second housing portion 106, a display 108, a keypad 110, a speaker housing aperture 112, a microphone housing aperture 114, a headphone jack 116, and frame sidewall 122. Although not shown, in certain embodiments, the frame sidewall 122 is the exposed portion of a frame residing within or adjacent to the housing 102 that provides structural support for the media device 100 and various internal components. The housing 102 also includes various gaps 118 that may include openings, separations, vents, or other pathways between elements of the housing 102 that enable the passage of air or sound through the housing 102.

In one embodiment, the housing 102 includes a first housing portion 104 and a second housing portion 106 that are fastened together to encase various components of the media device 100. In certain embodiments, the housing 102 also includes an exposed frame 120 that provides structural support for the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, one or more circuit boards having integrated circuit components, internal radio frequency (RF) circuitry, an internal antenna, a speaker, a microphone, a hard drive, a processor, and other components. Further details regarding certain internal components are discussed later with respect to FIG. 3. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may include one or more housing apertures 114 to facilitate the reception of sounds, such as voice, for an internal microphone from a media device user.

In certain embodiments, the housing 102 includes one or more gaps 118 associated with the housing 102. These gaps 118 may result from the manufacturing and/or assembly process for the media device 100. For example, in certain circumstances, the mechanical attachment of the first housing portion 104 with the second housing portion 106 or the sidewall 122 results in a crease 120 or joint between the portions 104 and 106. In certain media devices 100, the crease 120 is not air tight, resulting in gaps 118 along the crease. Other gaps may be formed during assembly between, for example, one or more keys of the keypad 110 and the housing 102 or the display 108 and the housing 102, resulting in additional gaps 118. In other embodiments, the housing 102 may include additional portions that are integrated to form the housing 102 for the media device 100.

The media device 100 may include a wireless communications device such as a cellular telephone, satellite telephone, cordless telephone, personal digital assistant (PDA), pager, portable computer, or any other device capable of wireless communications. In fact, FIG. 1 shows an exemplary cellular telephone version of a broad category of media device 100.

The media device 100 may also be integrated within the packaging of other devices or structures such as a vehicle, video game system, appliance, clothing, helmet, glasses, wearable apparel, stereo system, entertainment system, or other portable devices. In certain embodiments, device 100 may be docked or connected to a wireless enabling accessory system (e.g., a wi-fi docking system) that provides the media device 100 with short-range communicating functionality. Alternative types of media devices 100 may include, for example, a media player such as an iPod® or Apple® iphone available by Apple Inc., of Cupertino, Calif., pocket-sized personal computers such as an iPAQ® Pocket PC available by Hewlett Packard Inc., of Palo Alto, Calif. and any other device capable of communicating wirelessly (with or without the aid of a wireless enabling accessory system).

In certain embodiments, the media device 100 may synchronize with, for example, a remote computing system or server to receive media (using either wireless or wireline communications paths). Wireless syncing enables the media device 100 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the media device 100. In certain embodiments, media and/or data is "downloaded" to the media device 100. In other embodiments, the media device 100 is capable of uploading media to a remote host or other client system. Further details regarding the capabilities of certain embodiments of the media device 100 are provided in U.S. patent application Ser. No. 10/423,490, filed on Apr. 25, 2003; U.S. application Ser. No. 11/770,641, filed Jun. 28, 2007; and U.S. application Ser. No. 11/834,604, filed Aug. 6, 2007, entitled "Synching Data" the entire contents of each of which are incorporated herein by reference.

Figure 1B:
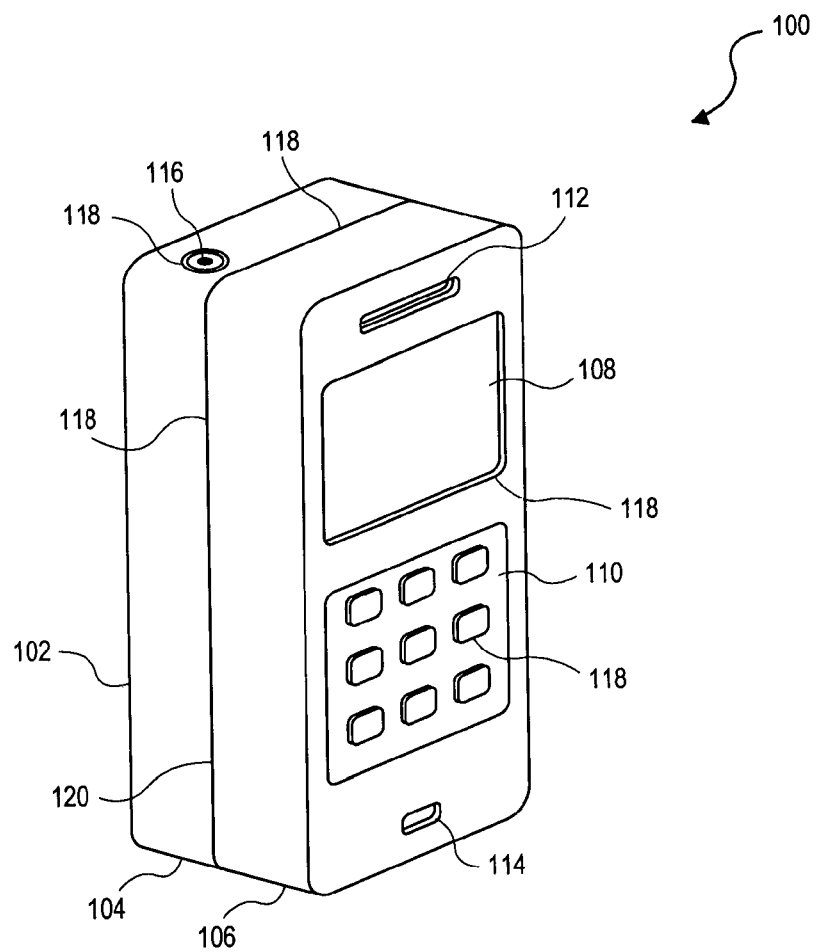
FIG. 1B is another perspective view of a media device according to an illustrative embodiment of the invention.

FIG. 1B is another perspective view of a media device 100 according to an illustrative embodiment of the invention. In this embodiment, as opposed to the embodiment of FIG. 1A, the media device's frame and/or the frame's sidewalls are not exposed to an external surface of the device. However, in certain embodiments, the frame is connected internally with at least a portion of one of the first housing portion 104 or the second housing portion 106.

Figure 2:
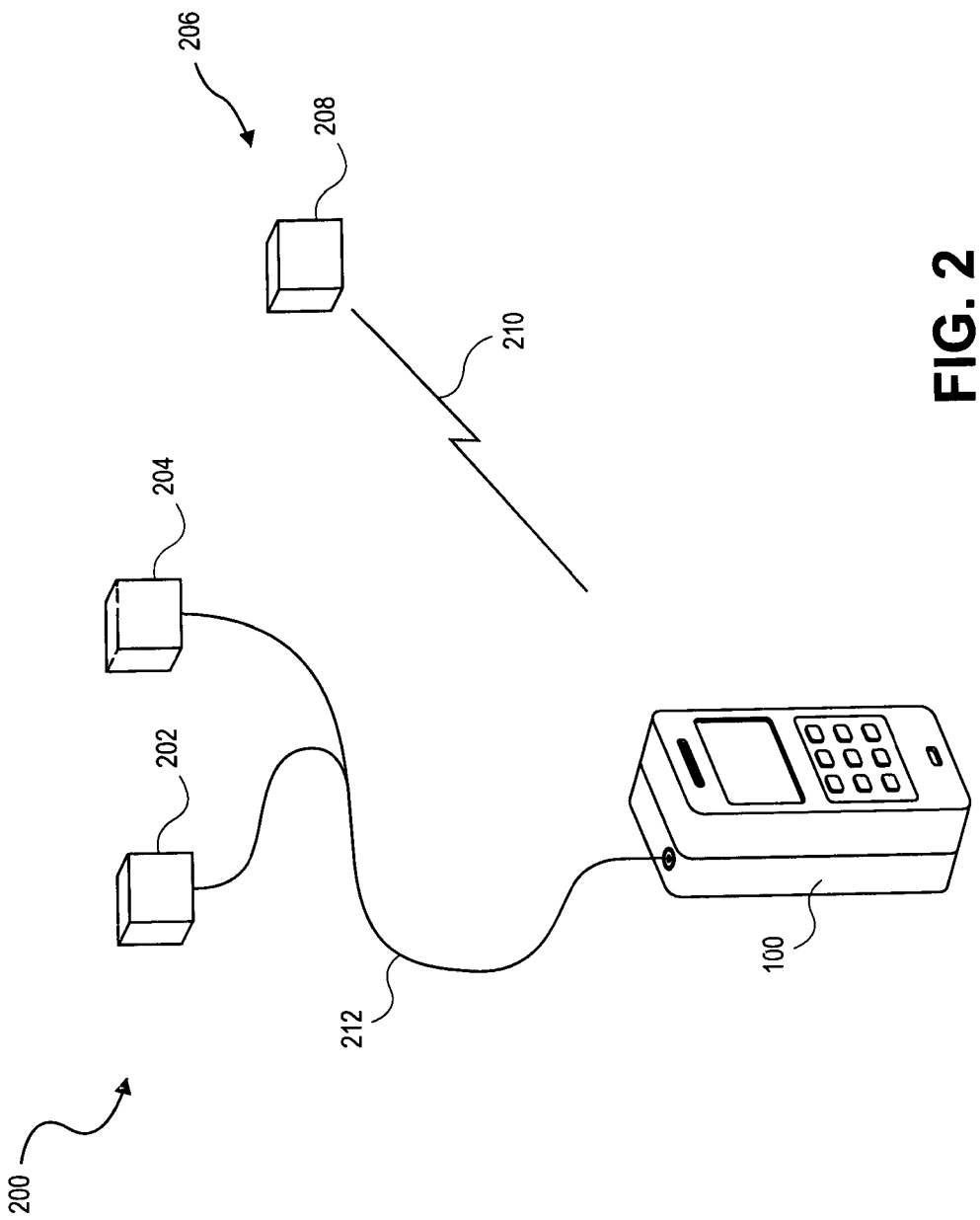
FIG. 2 shows the media device of FIGS. 1A and 1B with tethered headphones and, alternatively, a wireless earpiece according to an illustrative embodiment of the invention.

FIG. 2 shows the media device 100 of FIG. 1 with tethered headphones 200 and, alternatively, a wireless earpiece 206 according to an illustrative embodiment of the invention. The tethered headphones 200 include a cable 212 that connects to the media device 100 via external jack 116. In one embodiment, the cable provides for transport of an audio signal from the media device 100 to the headphones 200. In another embodiment, the headphones 200 includes a left housing 202 and a right housing 204, corresponding to the left and right ears of a user, respectively. Each housing 202 and 204 may include a speaker and/or an acoustic assembly as described later with respect to FIG. 4. The headphones 200 may optionally include a microphone to facilitate sending sounds from the user to the media device 100. As an alternative to the headphones 200, a user may utilize the wireless earpiece 206 which includes a housing 208. In one embodiment, the earpiece 206 employs wireless channel 210 to receive audio signals from the device 100 or transmit audio signals to the device 100. The housing 208 may include a speaker, microphone, and/or acoustic assembly as described later with respect to FIG. 4.

Figure 3:
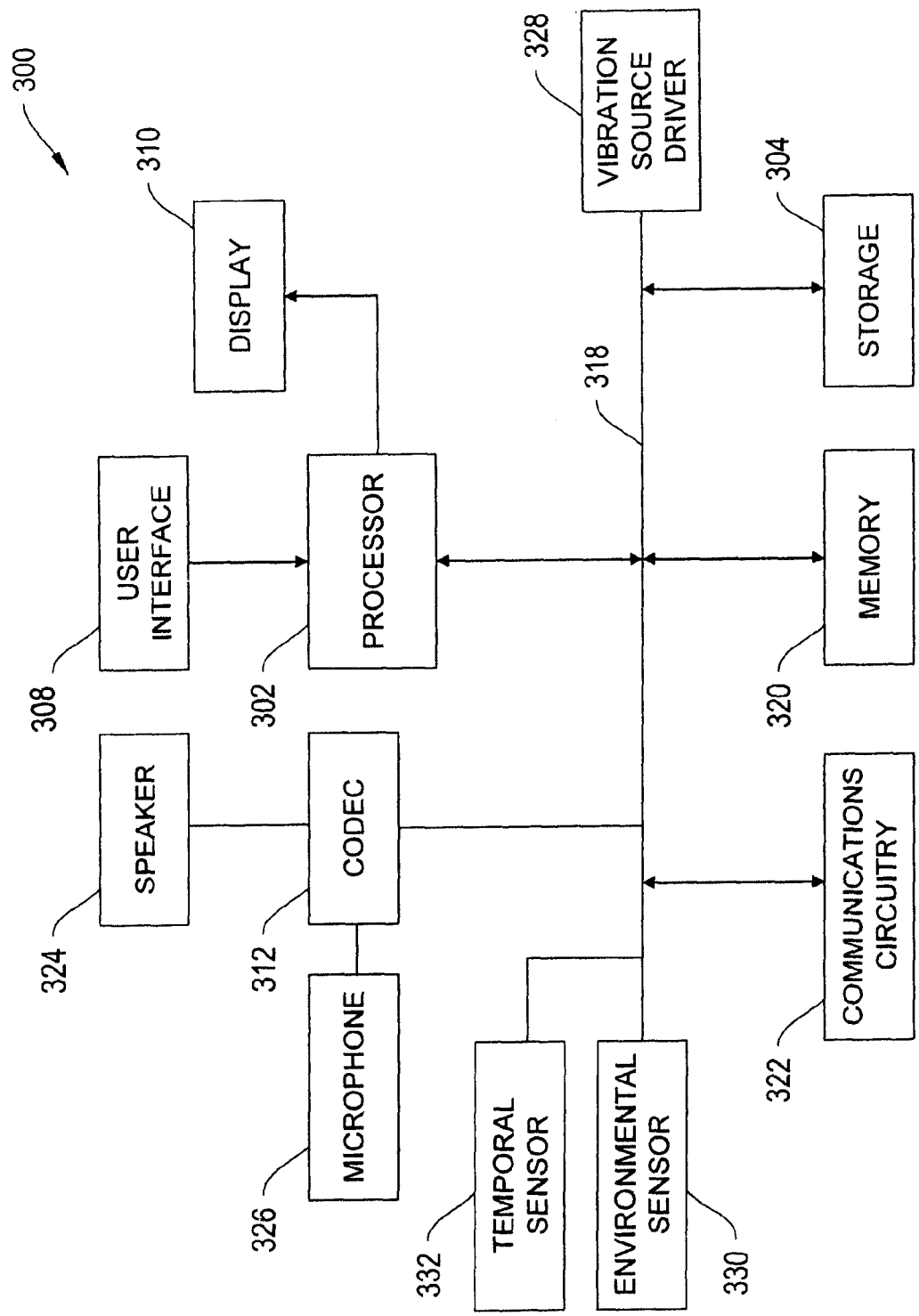
FIG. 3 shows a simplified functional block diagram of a media device according to an illustrative embodiment of the invention.

FIG. 3 shows a simplified functional block diagram of the media device 100 according to an illustrative embodiment of the invention. The media device or player 300 may include a processor 302, storage device 304, user interface 308, display 310, CODEC 312, bus 318, memory 320, communications circuitry 322, a speaker or transducer 324, a microphone 326, a vibration source driver 328, an environmental sensor 330, and/or a temporal sensor or source 332. Processor 302 may control the operation of many functions and other circuitry included in media player 300. Processor 302 may drive display 310 and may receive user inputs from the user interface 308. The temporal sensor or source 332 may include a clock within the processor 302, an oscillator, dedicated clock circuit and/or IC, a software based clock or timer application. The temporal source 332 may be synchronized with a remote timing source such as a network clock, remote server clock, timing standard source.

Storage device 304 may store media (e.g., music and video files), software (e.g., for implanting functions on device 300, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps tracks of podcasts or television shows or other media a user subscribes to), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 112 may be included to convert digital audio signals into an analog signals for driving the speaker 324 to produce sound including voice, music, and other like audio. The CODEC 112 may also convert audio inputs from the microphone 326 into digital audio signals. The CODEC 112 may include a video CODEC for processing digital and/or analog video signals.

User interface 308 may allow a user to interact with the media device 300. For example, the user input device 308 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocols standards could also be used, either in alternative to the identified protocols or in addition to the identified protocol. Other network standards may include Bluetooth, the Global System for Mobile Communications (GSM), and code division multiple access (CDMA) based wireless protocols. Communications circuitry 322 may also include circuitry that enables device 300 to be electrically coupled to another device (e.g., a computer or an accessory device) and communicate with that other device.

In one embodiment, the media device 300 may be a portable computing device dedicated to processing media such as audio and video. For example, media device 300 may be a media player (e.g., MP3 player), a game player, a remote controller, a portable communication device, a remote ordering interface, an audio tour player, or other suitable personal device. The media device 300 may be battery-operated and highly portable so as to allow a user to listen to music, play games or video, record video or take pictures, communicate with others, and/or control other devices. In addition, the media device 300 may be sized such that it fits relatively easily into a pocket or hand of the user. By being handheld, the media device 300 (or media device 100 shown in FIG. 1) is relatively small and easily handled and utilized by its user and thus may be taken practically anywhere the user travels.

As discussed previously, the relatively small form factor of the media devices 300 enables a user to easily manipulate the devices position, orientation, and movement. Accordingly, embodiments of the invention provide for improved techniques of sensing such changes in position, orientation, and movement to enable a user to interface with or control the media device 300 by affecting such changes. Further, the media device 300 may include a vibration source 328, under the control processor 302, for example, to facilitate sending motion, vibration, and/or movement information to a user related to an operation of the media device.

Figure 4:
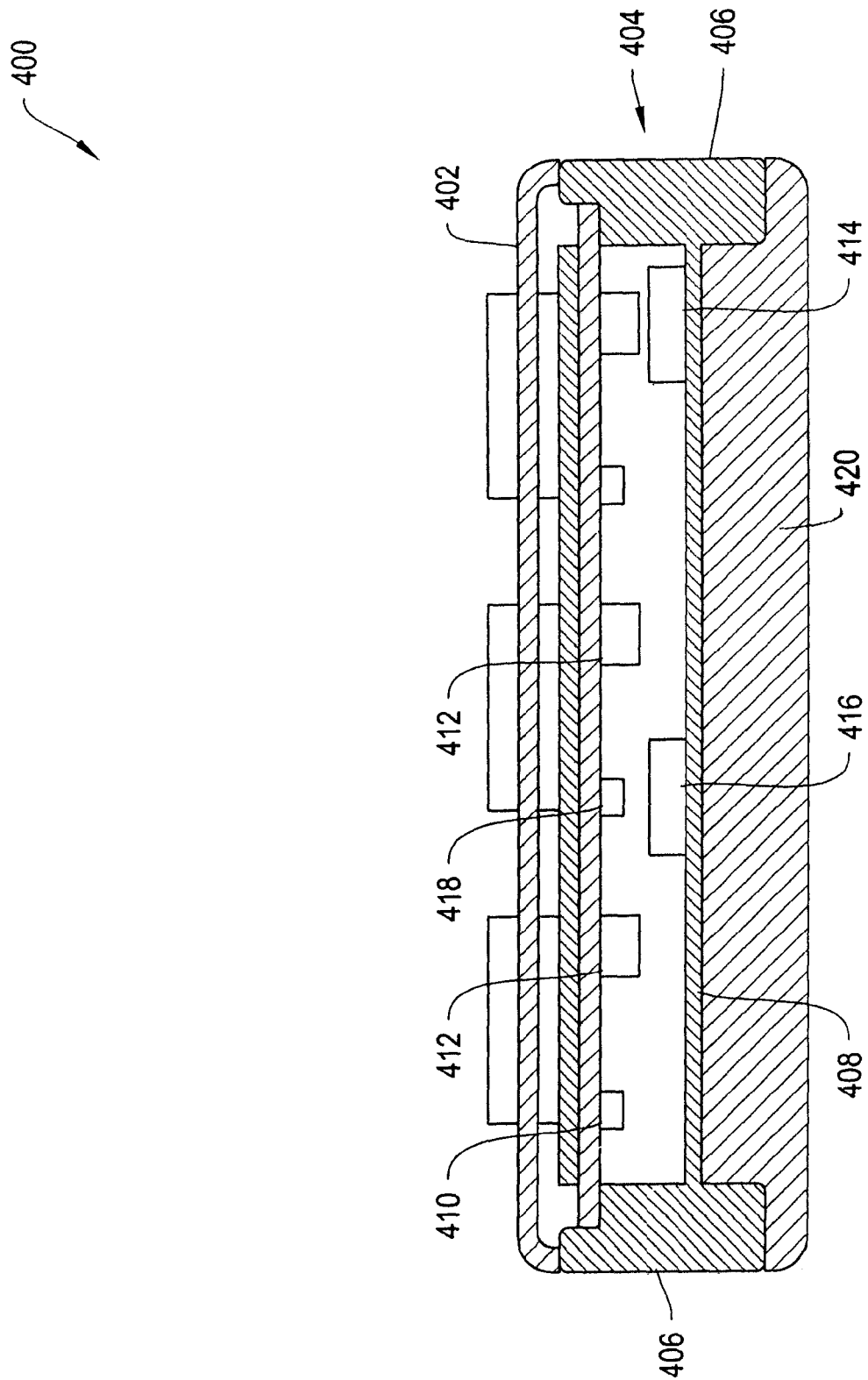
FIG. 4 shows a transverse sectional view of a media device including an vibration source and POM sensor according to an illustrative embodiment of the invention.

FIG. 4 shows a transverse sectional view of a media device 400 including a vibration source 414 and/or environmental sensor 416 according to an illustrative embodiment of the invention. The media device 400 comprises an upper housing 402. The main structural frame 404 is secured to the housing 402 which may be fabricated from a die-castable material using a die-casting process. The frame 404 includes a surrounding sidewall 406 and a web or backplane 408. The web 408 extends between the sidewall 406 and forms a printed circuit board compartment between the housing 402 and web 408. The printed circuit board compartment includes a printed circuit board 410 and associated electrical components 412. The web 408 supports or houses a battery 420 which, in turn, forms the back of the cellular telephone 400.

The media device 400 may employ a unitized frame member 404 which is composed of a single die-castable material, typically magnesium or zinc, where the sidewall 406 and the web 408 are constructed of the same or different material via a die-cast fabrication technique. In one embodiment, the media device 400 includes at least one vibration source 414. In another embodiment, the media device 400 includes at least one environmental sensor 416. The certain embodiments, one or both of the at least one vibration source 414 and environmental sensor 416 are in communication with the web 408, the circuit board 410, and/or a portion of a sidewall 406.

In the embodiment shown in FIG. 4, the environmental sensor 416 and vibration source 414 are in communication with the web 408 and/or frame 404. In certain embodiments, at least one of the environmental sensor 416 and vibration source 414 are mounted to and/or in communication with one or more of the web 408, the frame 404, the circuit board 410, the housing 402, and any other component or element of the media device 400.

In one embodiment, a portion of the printed circuit board 410, the memory 320, storage 304, processor 302, a battery, and a driver circuit 328 or 418, operate to form a vibration generating circuit for the vibration source 414. In certain embodiments, the vibration source 414 includes a generating motor. In other embodiments, the vibration source 414 includes a solenoid or other elements that generate a vibration, vibration pattern, and/or vibration sequence in response to an application running on the processor 302.

By way of example, one of the vibration generating motors, "FM16, FM23, FM25 or FM29" or "CM-5", manufactured by the Tokyo Parts Industries Corporation, LTD of Tokyo, Japan, may be utilized as a vibration source 414. By further example, the "FM" motor employs an eccentric member that is attached to a rotating shaft incorporated in a cylindrical case. The eccentric member is rotated according to a rotation of the rotation shaft, and thereby, a vibration is generated from the vibration source 414 that is coupled to at least one of the web 408, the frame 404, the circuit board 410, the housing 402, and any other component or element of the media device 400. By another example, the "CM" motor employs a armature coil that is mounted in an eccentric manner. By rotating the armature, a vibration is generated. Further, if the vibration source 414 employs a solenoid, a core within the solenoid is reciprocally moved and, thereby, a vibration is generated.

Regardless of the physical element employed, the vibration source 414 may be driven by the driver circuit 328 and/or 418 in response to the processor 302. The consumption of electric power by the vibration source 414 may be substantial. Accordingly, an application may be employed to provide for the activation and/or deactivation of the vibration source 414 depending on the power needs of the media device 400. In certain embodiments, the vibration source driver circuit 328 and/or 418 is configured to adjust at least one of the frequency of vibration, strength of vibration in one or more pre-selected or defined sequences and/or patterns.

Figure 5:
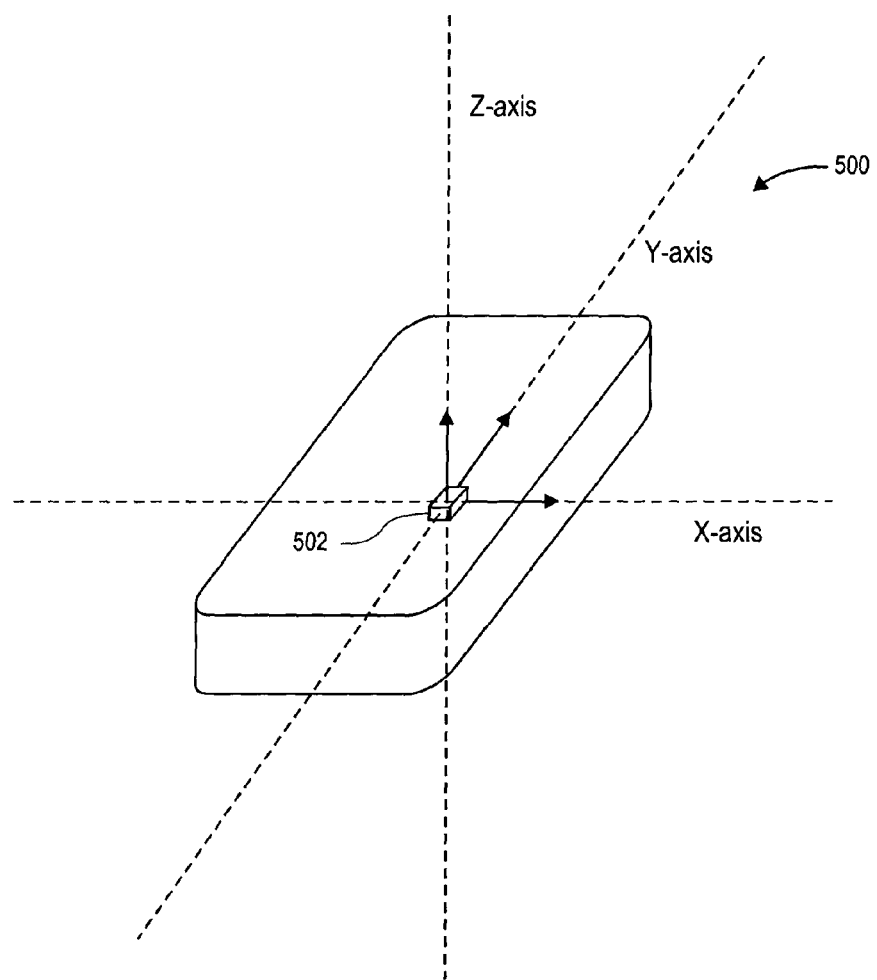
FIG. 5 is a perspective transparent view of an three-dimensional accelerometer within a media device according to an illustrative embodiment of the invention.

FIG. 5 is a perspective transparent view of an three-dimensional acceleration sensor or accelerometer 502 within a media device 500 according to an illustrative embodiment of the invention. In certain embodiments, the POM sensor 416 includes an acceleration sensor and/or accelerometer 502 that detects an acceleration in three axial directions of the media device 500, i.e., the up-down direction (Y-axis), the left-right direction (X-axis), and the front-rear direction (the Z-axis). The acceleration sensor allows the inclinations and movements of the media device 500 in the X-axis, Y-axis and Z-axis directions to be determined. In one embodiment, acceleration data detected by the acceleration sensor 502 is transmitted to the processor 302 for processing to enable determination of the position, orientation, and movement of the media device 500.

In one embodiment, the media device 500 includes a three-axis or three-dimensional, linear acceleration sensor 502 that detects linear acceleration in each of the three axial directions shown in FIG. 5. In an alternative embodiment, a two-axis linear accelerometer is employed that detects linear acceleration along each of the X-axis and Y-axis (or other pair of axes). A two-axis sensor may be sufficient depending on the types of positions, orientations, and movements that are desired to be detected and/or used to control the media device 500. By way of example, the three-axis or two-axis linear accelerometer 502 may be of the type available from Analog Devices, Inc. or STMicroelectronics®. The acceleration sensor 502 may be electrostatic capacitance or capacitance-coupling type that is based on silicon micro-machined MEMS (microelectromechanical systems) technology. In certain embodiments, other forms of accelerometer technology such as, without limitation, piezoelectric or piezoresistance based sensors may be employed to provide three-axis or two-axis acceleration detection.

Because the linear acceleration sensor 502, may only be capable of detecting acceleration along a straight line corresponding to each axis of the acceleration sensor, the acceleration sensor 502 may not be capable of directly detecting movement in the form of a non-linear (e.g. circular) path, a rotation, a rotational movement, an angular displacement, a tilt, a position, an attitude or another physical characteristic. Accordingly, in certain embodiments, through additional processing of the linear acceleration signals output from the acceleration sensor 502, additional information relating to the position, orientation, or movement of the media device 500 may be inferred or calculated by an application running on the processor 302.

For example, by detecting a static, linear acceleration (e.g., gravity), the linear acceleration output of the acceleration sensor 502 may be used to infer or calculate tilt or inclination of the media device 500 relative to the gravity vector by correlating tilt angles with detected linear acceleration. In this way, the acceleration sensor 502 may be used in combination with the processor 302 (or another processor) to determine tilt, altitude or position of the media device 502. Similarly, various movements, patterns of movement, and/or positions of the media device may be calculated or inferred through processing of the linear acceleration signals generated by the acceleration sensor 502 when the media device 500 is subjected to dynamic accelerations by, for example, the hand of a user. In one embodiment, the acceleration sensor 502 may include an embedded signal processor or other type of dedicated processor for performing any desired processing of the acceleration signals output from the acceleration sensor 502 and/or other accelerometers in the media device 500 prior to outputting signals to the processor 302. In certain embodiments, the embedded or dedicated processor or processors may convert the detected acceleration signal to a corresponding tilt angle when the acceleration sensor 502 is intended to detect static acceleration (e.g., gravity).

In certain embodiments, a pair of two-dimensional accelerometers may be employed within a media device 500 instead of using a single three-dimensional accelerometer. The two two-dimensional accelerometers may be arranged in relation to each other so as to enable three-dimensional sensing of the position, orientation, and movement of the media device 500.

In certain embodiments, at least two three-dimensional accelerometers may be employed within a media device 500 for enhanced sensing capabilities. Thus, a plurality of accelerometers may be positioned within the media device 500 at any one of a plurality of locations.

Figure 6:
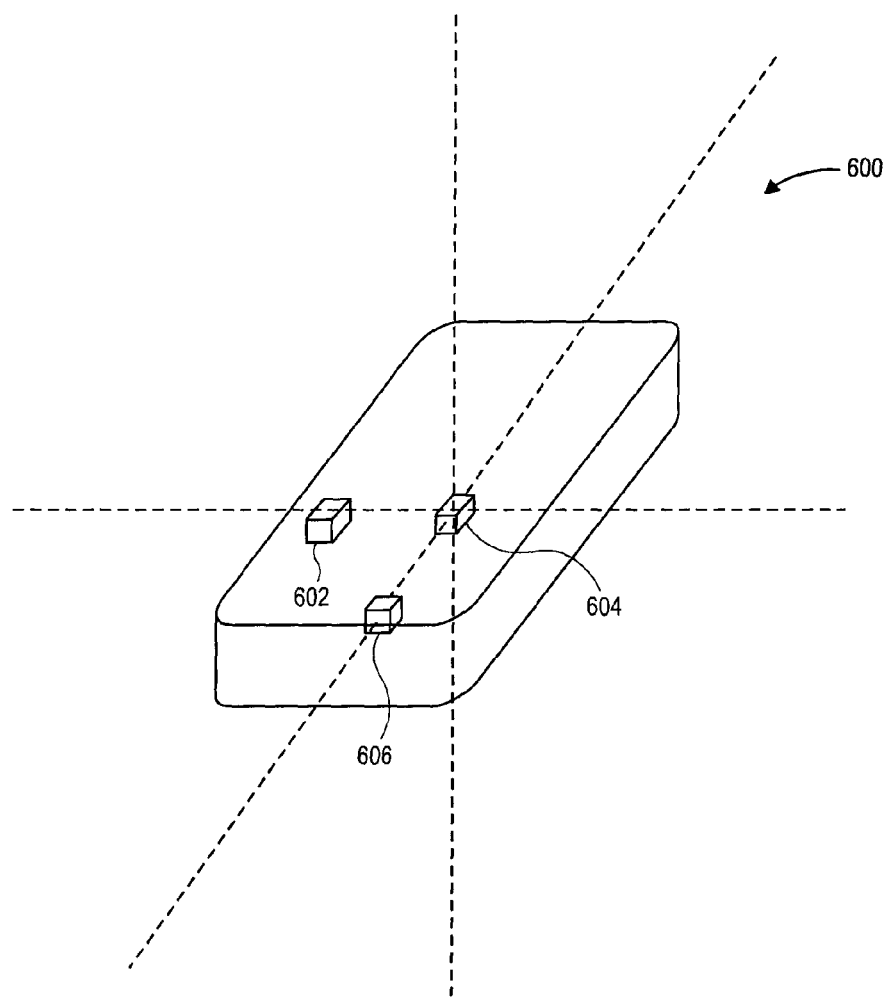
FIG. 6 shows a perspective transparent view of a plurality of environmental sensors within or attached to a media device according to an illustrative embodiment of the invention.

FIG. 6 shows a perspective transparent view of a plurality of environmental sensors 602, 604, and 606 within or attached to a media device 600 according to an illustrative embodiment of the invention. In one embodiment, a gyro-sensor or gyroscope 602 may be employed instead of or in addition to an acceleration sensor 604. In certain embodiments, the gyro-sensor 602 may include a rotating or vibrating element. Exemplary MEMS gyro-sensors that may be used in this embodiment are available from Analog Devices, Inc. Unlike the linear acceleration sensor 604, a gyro-sensor 602 is capable of directly detecting rotation (or angular rate) around an axis defined by the gyroscopic element (or elements) of the gyro-sensor 602. Because there are fundamental differences between a gyro-sensor 602 and a linear acceleration sensor 604 (e.g., angle-based vs. vector-based output), different processing operations are performed on the output signals from these different sensor devices.

For example, when tilt or inclination is calculated using a gyro-sensor 602 instead of the acceleration sensor, different algorithms and/or applications may be employed by the processor 302 to determine position, orientation, and/or movement of the media device 600. In one embodiment, when using a gyro-sensor 602, the value of inclination is initialized at the start of detection. Then, data on the angular velocity which is output from the gyroscope 602 is integrated. Furthermore, a change amount in inclination from the value of inclination previously initialized is calculated. In this case, the calculated inclination corresponds to an angle. In contrast, when an acceleration sensor 604 is used, the inclination may be calculated by comparing the value of the acceleration of gravity of each axial component with a predetermined reference. Accordingly, the calculated inclination may be represented as a vector and, without initialization, an absolute direction may be determined with an accelerometer. In certain embodiments, one or more environmental sensors may be employed to detect at least one of absolute and relative position, orientation, and movement information.

The type of the value calculated as an inclination may also be different between a gyroscope 602 and an accelerometer 604. For example, the value may be an angle when a gyroscope 602 is used, but a vector when an acceleration sensor 604 is used. Accordingly, when a gyroscope 602 is used instead of an acceleration sensor 604 or vice versa, the sensor data on inclination may be processed by a predetermined conversion that takes into account the fundamental differences between a gyro-sensor 602 and an accelerometer 604. Due to the fact that the nature of gyroscopes is known to one skilled in the art, as well as the fundamental differences between linear accelerometers and gyroscopes, further details are not provided herein. While gyro-sensors provide certain advantages due to their ability to directly detect rotation, linear acceleration sensors may be more cost effective when used in connection with portable media device 600.

In certain embodiments, the media device 600 may include an environmental or POM sensor 606 in addition to at least one of an accelerometer 604 and a gyro-sensor 602. The additional sensor 606 may be a light sensor, an infrared (IR) sensor, proximity sensor, capacitive proximity sensor, acoustic sensor, a microphone, sonic or sonar sensor, radar sensor, image sensor, video sensor, global positional system (GPS) detector, RF detector, RF triangulation detector, magnetometer, RF or acoustic doppler detector, or other like environment sensor. In one embodiment, the media device 600 employs a plurality of POM, environmental and/or other sensors 602, 604, and 606 to determine the position, orientation, and/or movement of the media device 600. In one embodiment, the media device 600 employs a GPS sensor in combination with one or more other sensors. The media device 600 may employ a GPS sensor as described in U.S. patent application Ser. No. 12/005,822, filed on Dec. 28, 2007, entitled "Event-Based Modes For Electronic Devices"the entire contents of which are incorporated herein by reference.

In one embodiment, a microphone or other audio input sensor is configured to detect an audio signal at a particular frequency, e.g., ultrasonic signal, or a sequence of audio signals and, in response to detecting such signal or signals, controlling the operation of the media device. For example, a particular venue, such as a movie theater, hospital, or court room, may use an emitter that emits an ultrasonic signal or other signal. This signal may be undetectable by humans, but detectable by a microphone, and provide a proximal indicator to a media device to operate in a particular manner. Thus, when the media device detects the signal, the media device may perform at least one of turn off, change its alert mode, and generate a user notification to allow a user to perform a function such as turn off the media device.

In certain embodiments, the media device 600 includes an environmental or POM sensor that generates a sensor signal based on at least one of a position, orientation, and movement of the media device. The media device may also include a processor that receives the environmental or POM sensor signal and controls one or more operations of the media device based at least in part on the sensor signal. For example, by performing one or more defined or pre-selected movements of the media device, a user can control various operations of the media device. In one embodiment, a user controls an output characteristic, e.g., an alert characteristic, by affecting the position, orientation, and/or movement of the media device 600.

Figure 7:
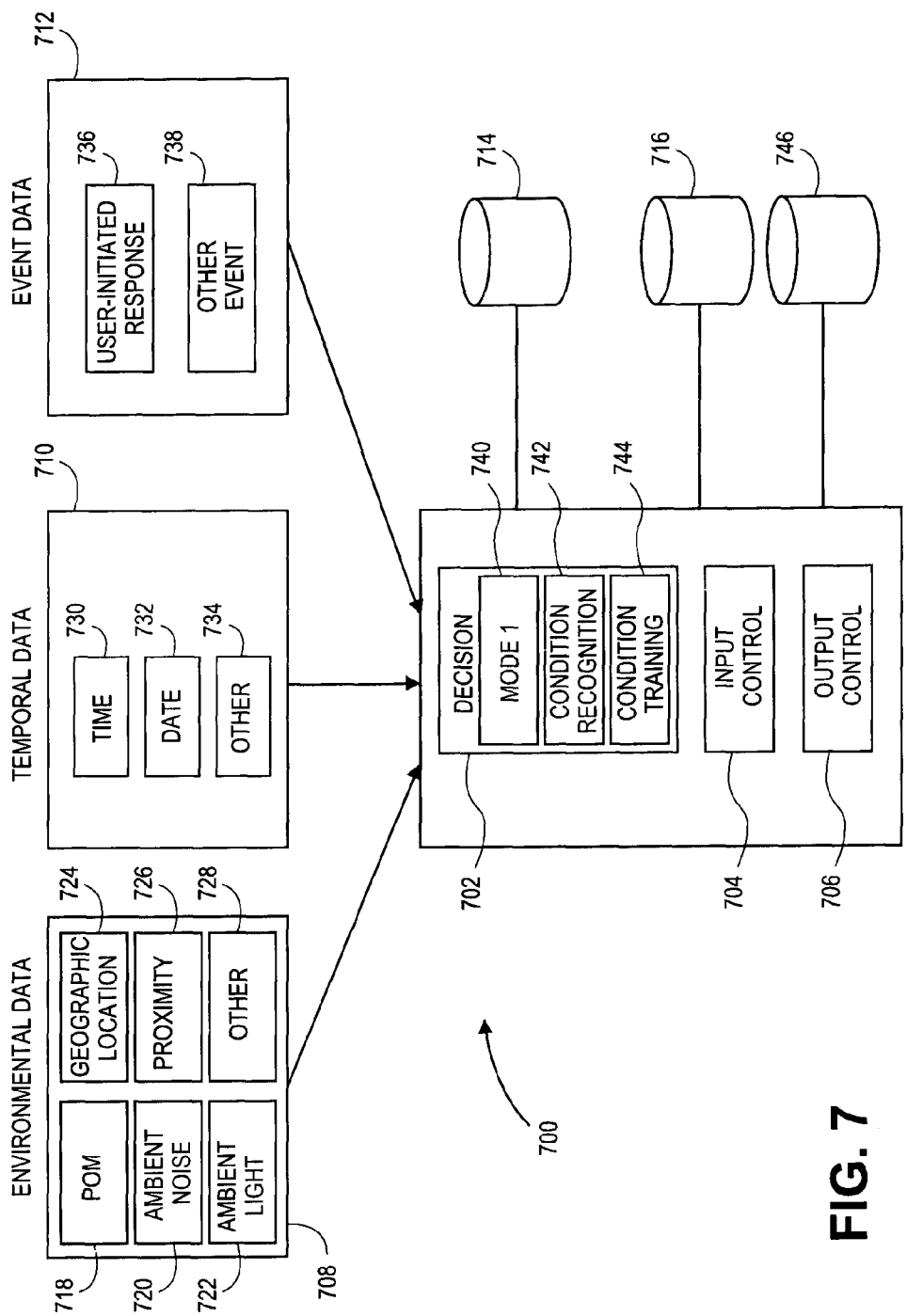
FIG. 7 is a diagram of a computer processing environment 700 including various applications or routines running within a media device according to an illustrative embodiment of the invention.

FIG. 7 is a diagram of a computer processing environment 700 including various applications or routines running within a media device according to an illustrative embodiment of the invention. The processing environment 700 may include a decision application 702, an input control application 704, an output control application 706, environmental data 708, temporal data 710, event data 712, a condition vector database 714, an alert pattern database 716, and/or an input/output interface configuration database 746. The environmental data 708 may include, without limitation, POM data 718, ambient noise or sound data 720, ambient light data 722, geographic location data 724, proximity data 726, and/or other environmental data 728. The temporal data 710 may include time data 730, date data 732, and/or other time-based data 734. The event data 712 may include user-initiated response data 736 and/or other event-related data 738.

In certain embodiments, the input control application 704, output control application 706, and/or another application configure the input and/or output characteristics of a media device based on a determination of the associated conditions for the media device by the decision application 702. The decision application 702 may determine the associated conditions for the media device by comparing received condition data with a known set of condition vectors. The decision application 702 may include a decision model 740, a condition recognition application 742, and/or a condition training application 744. In one embodiment, the model 740 includes a statistical model and/or predictive model for determining a user's desired input or output characteristics based on the received condition data. An output characteristic may include an alert characteristic.

Figure 8:
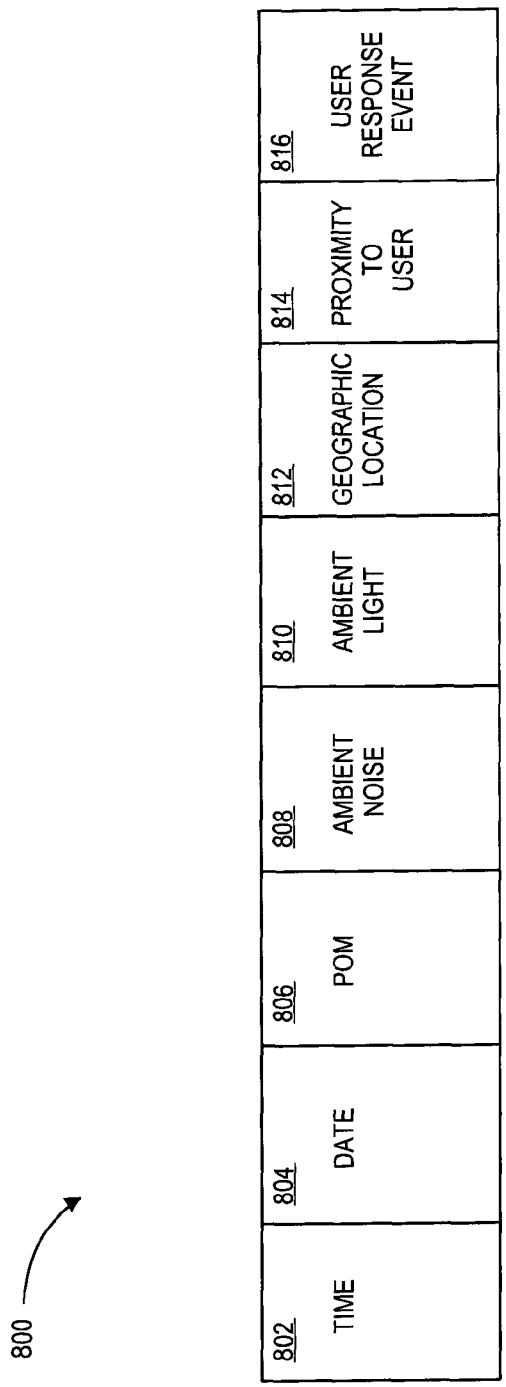
FIG. 8 is a diagram of a condition vector including various associated conditions according to an illustrative embodiment of the invention.

FIG. 8 is a diagram of a condition vector 800 including various associated conditions according to an illustrative embodiment of the invention. The condition vector 800 may include one or more elements such as, without limitation, time data 802, date data 804, POM data 806, ambient sound data 808, ambient light data 810, geographic location data 812, proximity (to user) data 814, and/or user-response/user-initiated event data 816. In certain embodiments, the environmental data 708, temporal data 710, and event data 712 are combined, arranged, organized, referenced, and/or referred to as a condition vector 800.

In one embodiment, a media device generates an environmental sensor signal and/or signals including environmental data 708, generates a temporal signal and/or signals including temporal data 710, and/or generates an event signal and/or signals including event data 712. The various data 708, 710, and 712 from the various signals may be combined to form a received condition vector. The decision application 702 may compare the received condition vector with one or more known condition vectors that are stored within the database and/or data store 714 to determine associated conditions for a media device. Accordingly, the condition vector 800 may be representative of a received condition vector formed from the detected and/or sensed associated conditions of a media device at a particular instant or over a particular period. Alternatively, the condition vector 800 may be representative of a known or stored condition vector within the database 714.

In one embodiment, the condition vector 800 includes one or more known and/or stored condition vectors that operate as a rule set and/or rule sets to determine input and/or output characteristics of a media device. In certain embodiments, the input control application 704 determines an input interface feature and/or characteristic based on a decision signal from the decision application 702. In certain embodiments, the output control application 706 determines an output interface feature and/or characteristic based on a decision signal from the decision application 702. In one embodiment, the output control application 706 determines an alert pattern and/or characteristic based on a decision signal from the decision application 702.

In one embodiment, any element of a known and/or stored condition vector 800, e.g. time data element 802, may include a range of values. Accordingly, a known condition vector may function as a rule set that defines a period of time for which an expected input or output characteristic is to be configured. For example, the time data 802 field or element may specify a time range associated with normal work hours, e.g., 9am-5pm. Thus, a received condition vector having a time stamp and/or time data set at 10:30 am would satisfy or fall within the work hours time range set within the known condition time data element 802. Depending on the type of decision model employed by a model application 740, the model application 740 could select a particular input and/or output characteristic based at least in part on whether the received time data element was in the defined range of the time data element 802 of a known condition vector or rule set.

Other elements of a known condition vector or rule set may include ranges of values. For example, the date data element 804 could specify a range of days in the week, e.g., weekdays. The POM data element 806 could specify a range of movements or range of rates of movement, e.g., speed of tilting a media device. The ambient noise data element 808 could specify a threshold amount of sound intensity, e.g., whether it is noisy or quiet. The ambient light data element 810 could specify a threshold amount of light intensity, e.g., whether it is night or day. The geographic location data element 812 could specify a threshold distance from a particular geographic point, e.g., the location of a courthouse. The proximity data element 814 could specify a threshold proximity to a media device user. The event data element 816 could specify a range of user response types or affects to a media device.

In one embodiment, the known condition vector 800 and/or rule set includes an event counter element. The event counter element may include a count of the number of times that an event has occurred, has not occurred, or should have occurred. For example, if a user fails to answer a call after several alert instances of the same vibration pattern or after several attempted calls using the same vibration pattern, the decision application 702 may, after a threshold and/or limit of instances is reached, change the alert to a different vibration pattern and/or other alert pattern. Because there may be instances where a media device user may become desensitized to a particular alert pattern, by employing the event counter, the decision application 702 can advantageously adjust and/or change a particular alert pattern to make it less likely that a user will ignore subsequent alert patterns. In another embodiment, the decision application 702 may periodic change the alert pattern in a deterministic and/or random manner after a period of time so the alert pattern continuously changes. Such continuously and/or periodic changing of the alert pattern may be more readily perceivable by a user.

Figure 9:
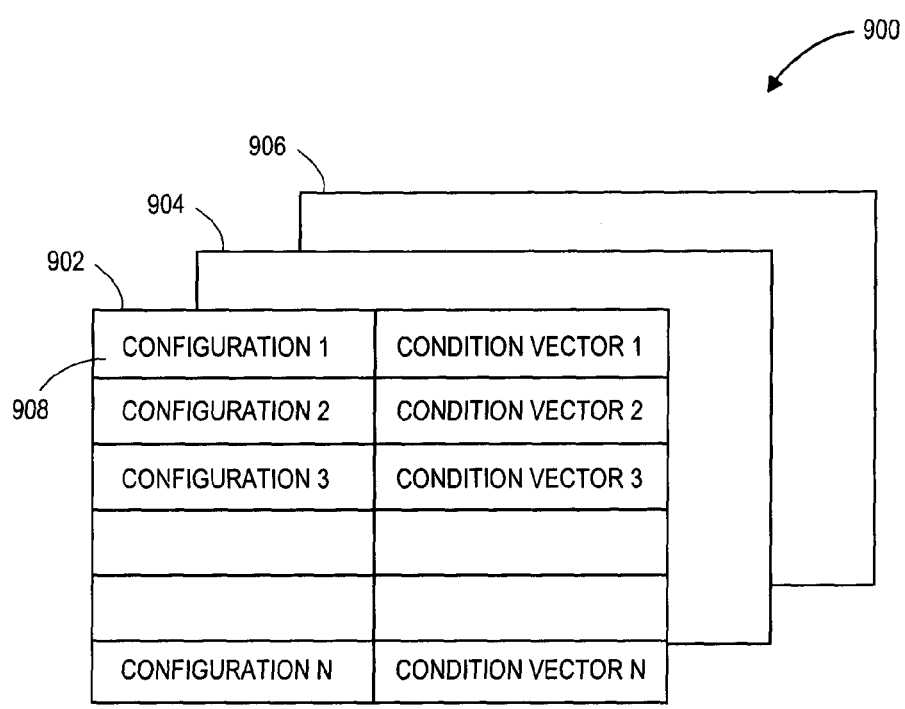
FIG. 9 is a diagram of a database including one or more lists associating condition vectors with input or output interface configurations and/or characteristics of one or more applications within a media device according to an illustrative embodiment of the invention.

FIG. 9 is a diagram of a database 900 including one or more lists associating condition vectors with input or output interface configurations and/or characteristics 908 of one or more applications 902, 904, and 906 within a media device according to an illustrative embodiment of the invention. In one embodiment, an output interface configuration includes an alert pattern. An output interface configuration may include, without limitation, a display setting, an audio setting, a GUI configuration, a video output setting, a vibration output setting, a communications output setting, an RF output setting, and/or any other output from a media device. An input configuration setting may include, without limitation, a display setting, a GUI configuration, an audio input setting, a video input setting, a communications input setting, an RF input setting, a POM input setting, and/or any other form of input setting. A setting may include an intensity level setting, an on/off setting, a pattern arrangement, a sequence arrangement, type of protocol, and/or any other characteristic of an interface input or output signal or representation. For example, for a speaker output, the setting may include an audio volume setting. For a microphone, the setting may include an input gain level of received audio signals. The database 900 may include multiple lists 902, 904, and 906 of configurations 908 where each list is associated with a particular application of a media device such as media device 100.

In operation, in one embodiment, configurations 1 through N are associated with condition vectors 1 through N respectively. Thus, when the application 902 is running, the application 902 may continuously compare received sensor signals and other condition signals with the list of condition vectors associated with application 902 to determine when one or more of the input or output configurations is to be selected. By monitoring the sensor signal inputs from the environmental sensors, the time data, and/or event data, the application 902 may recognize that the associated conditions for a media device match condition vector 1. Therefore, the output configuration 1 associated with condition vector 1 is selected. Configuration 1 may be, for example, an alert pattern that is appropriate for the detected associated conditions of the media device at that instant or period of time.

Figure 10A:
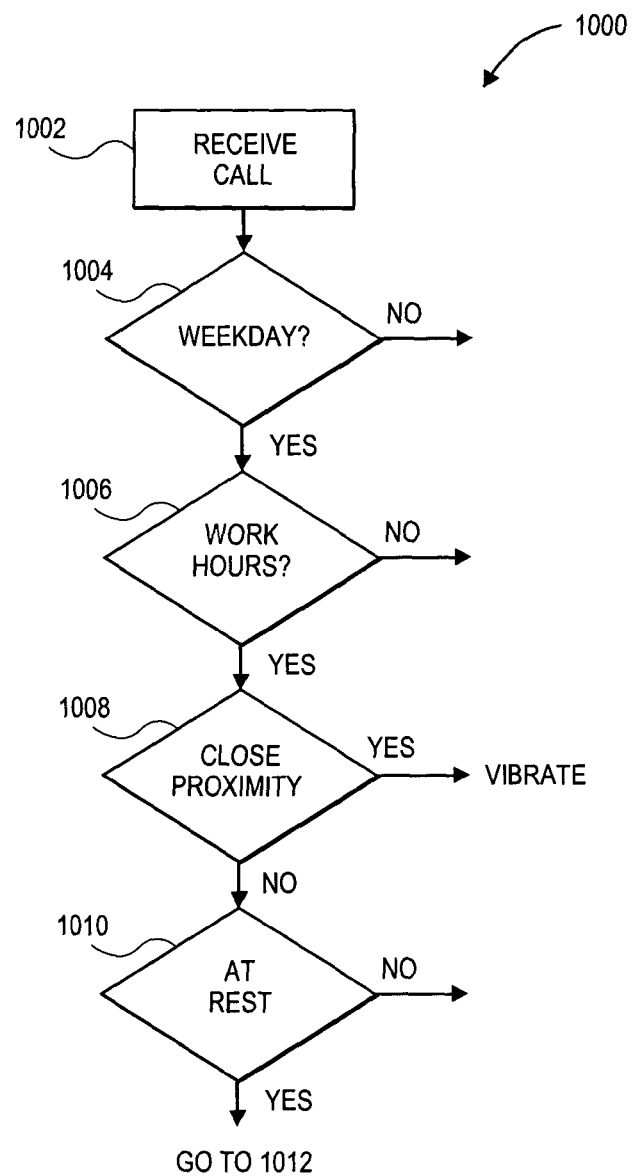
FIGS. 10A-C include a flow diagram of an exemplary process for determining an alert pattern for a telephone application of a media device based on associated conditions of the media device according to an illustrative embodiment of the invention.
Figure 10B:
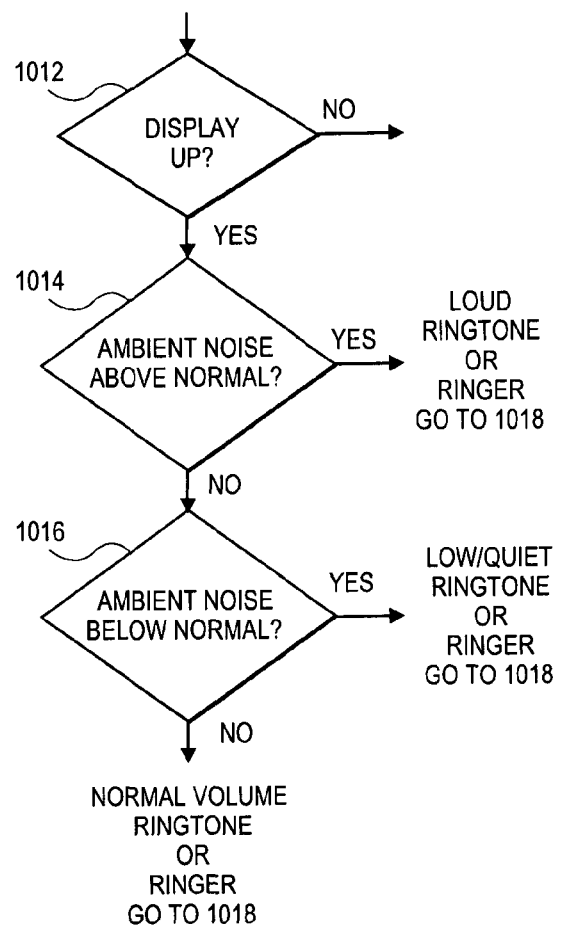
Figure 10C:
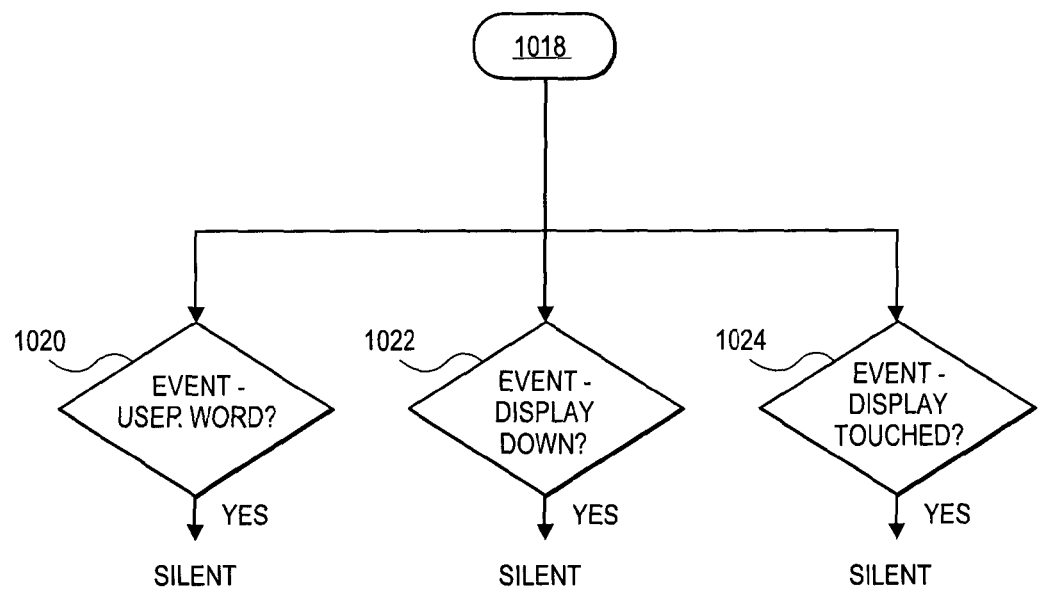

FIGS. 10A-C include a flow diagram of an exemplary process 1000 for determining an alert pattern for a telephone application of a media device based on associated conditions of the media device according to an illustrative embodiment of the invention. In one embodiment, the media device employs a decision application 702 that uses a matching algorithm and/or decision tree to determine associated conditions of the media device and, thereby, to determine a particular output alert pattern or characteristics for such associated conditions. First, the media device receives and incoming cellular telephone call [Step 1002]. The media device may be running a telephone application including a decision routine such as decision application 702 of FIG. 7. Alternatively, the telephone application uses one or more procedure calls to the decision application 702 to enable the decision application 702 to determine the desired alert pattern based on the associated conditions of the media device.

In one embodiment, the decision application 702 compares the received data with one or more condition vectors 800 and/or rule sets such as in database 714 and/or in the database 900. At step 1004, the decision application 702 determines whether the received date data is a weekday. If yes, the application 702 determines whether the received time data is during work hours at step 1006. If yes, the application 702 determines whether the received proximity data indicates that the media device is in proximity to the user at step 1008. If in close proximity, the decision application 702 determines that the alert pattern should vibrate the media device. If the application 702 determines that the device is not in close proximity, then the application 702 determines whether the media device is at rest at step 1010. If yes, the application 702 determines whether the media device display is oriented and/or facing in an upward direction at step 1012. If yes, the application 702 determines whether the ambient noise and/or sound level is above normal based on the received ambient noise data at step 1014. If yes, the application 702 determines that the alert pattern includes a loud ringtone or ring. If no, the application 702 determines whether the ambient noise and/or sound level is below normal based on the received ambient noise data at step 1016. If yes, the application 702 determines that the alert pattern include a low and/or quiet ringtone or ring. If no, the application 702 determines that the alert pattern include a normal volume ringtone or ring.

In certain embodiments, any type of time criteria may be used. For example, the decision application 702 may check for, without limitation, a particular day of the week, date in the year, time of day, date and time, date and time range, range of days in a week, range of times in a day, or other like period.

Once an incoming call alert is detected by a media device user, the user may wish to affect the alert by taking an action such as manipulating the POM of the media device. Such action may be detectable as an event by the media device. Accordingly, after a ringtone or ring is generated at either step 1014 or 1016, the user may initiate a subsequent event at step 1018 that is detected by at least one environmental sensor of the media device. At least one environmental sensor may then send a sensor signal to the decision application 702. The decision application may then compare the event signal or data 712 with an event vector element 816 to determine whether the alert pattern and/or output is to be adjusted. For example, at step 1020, the decision application 702 determines whether an environmental sensor detected a user word. For instance, a user may say "silence" when the media device is ringing. If yes, the alert pattern is changed to a silent mode. If no, the alert pattern remains at one of the setting/patterns determined by steps 1014 or 1016.

By way of another example, a user may turn the media device over so that its display is face down. A sensor may detect the change in orientation of the media device and send an event signal or data 712 to the decision application 702. The decision application may then compare the event signal or data 712 with an event vector element 816 to determine whether the alert pattern and/or output is to be adjusted. At step 1022, the decision application 702 determines that the media device display is face down, resulting in the alert pattern being adjusted to silent mode. By way of a further example, a user may simply touch a display screen of the media device to silence the alert output at step 1024. In one embodiment, a user may touch the media device at any location, such as a key on a keypad, to cause the media device to silence the alert. Again, the display contact is detected by a display element, causing an event signal or data 716 to be sent to the decision application 702. The decision application then determines that the subsequent display touch event occurred, resulting in the alert output being adjusted to silent mode.

In certain embodiments, a condition vector 800 may include ambient noise spectrum data. Accordingly, the decision application 702 may have the capability to determine a particular frequency range, ranges, and/or tones of ringtone or ring alert outputs that are more readily detectable by a user in comparison to the ambient noise spectrum. In one embodiment, the acoustic tuning and/or equalization of a speaker is dynamically adjusted in response to the surrounding ambient noise spectrum to enhance a user ability to hear, understand, and/or detect an alert or other audio output. In certain embodiments, an alert output setting, e.g., ring volume, is adjusted according to a discrete set of volume levels. In other embodiments, an output and/or input setting may be adjusted relative to a received or detected environment signal. For example, the alert ringtone volume may be adjusted such that the output volume is at least about 5, 10, 20, 30, 40, 50, 60, 70, 80, 90, 100 decibels (db), or any other suitable decibel level above the detected ambient noise volume.

The FIG. 10A-C process is exemplary in that the desired input or output characteristic settings may be configured differently depending on the preferences of a particular user. While one user may desire that a media device ring loudly under one set of conditions, another user, under the same conditions, may desire that the media device vibrate in a particular pattern along with periodically flashing an incoming caller identifier. In certain embodiments, a user can configure a plurality of combinations of alert patterns. An alert pattern may include, without limitation, one or more vibration patterns, one or more audio patterns, one or more display patterns, one or more text sequences, one or more caller identifiers, one or more communications sender identifiers, one or more light emitting sequences, one or more video sequences, one or more audio voice terms, and one or more combinations of the foregoing alert patterns. An identifier may include, without limitation, a telephone number, an email address, a name, a photograph, a video, an image, a URL, an Internet Protocol (IP) address, and/or a serial number.

Referring to FIG. 7, the decision application 702 may employ one or more types of decision models 740 to select an input and/or output characteristic of a media device. The sophistication of the implemented decision model 740 and/or models may vary depending on desired selectivity and available processing power of a media device, among other factors.

In one embodiment, as discussed above, the decision application 702 employs a condition vector 800 matching model. Using this model, the decision application 702 may compare a received condition vector with one or more known condition vectors 800. In one embodiment, if all of the conditions of each element of the received condition vector match and/or satisfy all of the conditions of the known condition vector 800, then the decision application 702 identifies the associated conditions of the media device and related desired input and/or output characteristic configuration. If, for example, the associated conditions match the condition vector 1 in the database 900, then the decision application 702 determines that the associated input or output characteristics are to be set to configuration 1 which is associated with the condition vector 1 in the database 900. In one embodiment, if there is no match of all elements with a known condition vector, the decision application 702 may designate a default configuration. In another embodiment, if there is no match of all elements with a known condition vector, the decision application 702 may select the closest condition vector and its associated configuration. In a further embodiment, the decision application 702 may apply another model such as, for example, a predictive and/or statistical model, to determine the most appropriate input or output characteristic configuration 908 for the associated conditions of the media device.

In another embodiment, the decision application 702 employs a weighted vector matching model 740. Accordingly, the application 702 may assign different weights for each element of a condition vector 800 depending on the type of input, output, and/or application that is running on the media device. For example, the decision application 702 may assign a boolean value of 1 for each element of a received condition vector that matches an associated element of a known condition vector. Depending on the type of input, output, or application of the media device, the decision application 702 uses multipliers or co-factors that increase or decrease the relative value one element with respect to another element. For example, if the interface output of interest is speaker volume, then the ambient noise element 808 may be assigned a higher value and/or higher value multiplier than, for example, the POM element 806. This may be the case because the orientation of the media device may be less important than the need to ensure that the volume level is adequate for the surrounding ambient noise conditions.

In one embodiment, the decision application 702 selects the closest matching condition vector 800 to the received condition vector. However, where there are multiple close condition vectors, the decision application 702 may distinguish among such condition vectors by accounting for the different weighting of the condition vector 800 elements. For example, if two known condition vectors have six matching elements to a received condition vector, the decision application 702 may then compare the elements to determine whether any are different between the two known condition vectors 800. If, for instance, condition vector 1 has a matching ambient noise element, but no matching POM element while condition vector 2 has a matching POM element, but no matching ambient noise element, the decision application 702 may select condition vector 1 as the closest for the speaker output volume configuration because the noise element has a higher weight for such output characteristic. In another embodiment, the decision application 702 computes a total score based on the weighted values for all of the matching elements of condition vectors 1 and 2, and selects the condition vector having the highest score.

In another embodiment, the decision application 702 employs a predictive and/or statistical model 740 to determine the desired input and/or output characteristics for particular associated conditions of a media device. To a certain extent, the predictive and/or statistical model 740 may employ more sophisticated decision approaches based on decision trees, matching techniques, data and/or factor weighing. The decision model 740 may include at least one of a linear regression model, a non-linear regression model, a logistic regression model, a Bayesian network model, a Markov model, a fuzzy model, and a propensity score to select one or more input or output characteristics. The decision model may assign a weight to each of the sensor signals and/or elements of a condition vector 800.

In one embodiment, the decision application 702 employs prospective modeling to predict desired input or output characteristics for a given set of associated conditions of a media device. In one embodiment, the application 702 uses demographic user IO preference information from a population of media device users. In another embodiment, the application 702 uses personal user IO preference information from the particular user of a media device. In certain embodiments, numerous variables may be used in developing a predictive model 740 based on user IO preferences that may include variables based on user age, gender, education, musical preferences, social preferences, technical preferences, and other like demographic profiles.

In certain embodiments, the decision application 702 employs a condition recognition routine 742 and/or condition training routine 744 to enable the identification of associated conditions of a media device.

Figure 11:
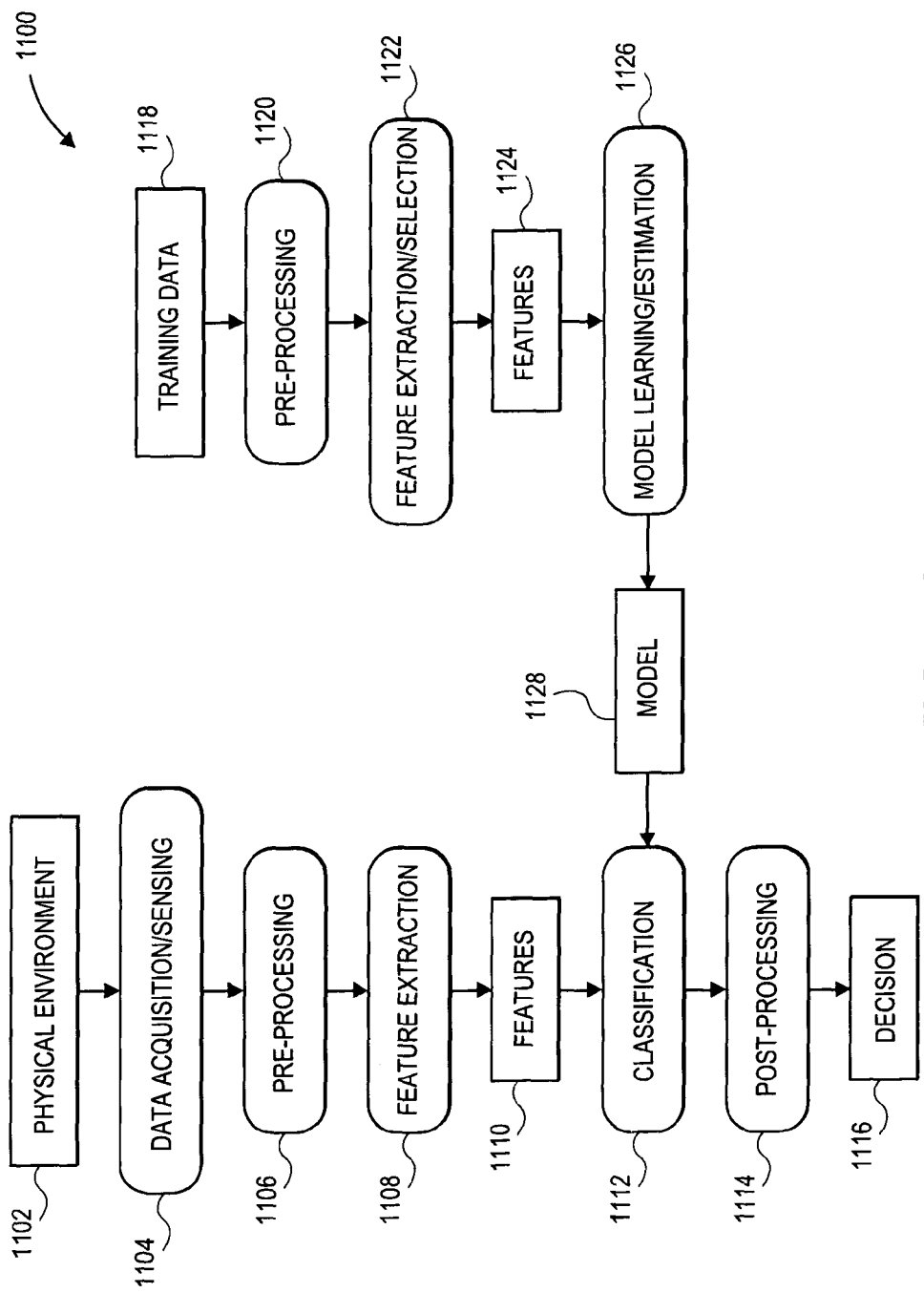
FIG. 11 is a flow diagram of a process for inputting and identifying movement patterns based on one or more pattern recognition algorithms according to an illustrative embodiment of the invention.

FIG. 11 is a flow diagram of a process 1100 for inputting and identifying condition vectors 800 associated with particular input/output characteristic configurations based on one or more pattern recognition algorithms according to an illustrative embodiment of the invention. In certain embodiments, the condition recognition application 742 and condition training application 744 employ one or more pattern recognition algorithms and/or techniques to identify various associated conditions and/or condition vectors of a media device. First, the media device 100 is subjected to associated conditions including its surrounding physical environment [Step 1102]. The media device 100 employs one or more environmental sensors to measure associated conditions. In certain embodiments, the applications 742 and 744 account for bandwidth, resolution, sensitivity, distortion, signal-to-noise ratio, latency, and other issues with regard to data acquisition using the one or more environmental sensors [Step 1104]. The applications 742 and 744 may perform pre-processing of the sensor signals to remove noise and/or to isolate patterns of interest from background information [Steps 1106 and 1120]. Then, the applications 742 and 744 may perform feature extraction by finding new representations in terms of identified features of sensor signals [Steps 1108 and 1122]. Particular features of sensor signals and/or condition vector elements may be identified as being more relevant for pattern identification [Steps 1110 and 1124]. Feature selection may include identifying discriminative features of sensor signals such as similar values for similar patterns or different values for different patterns. Feature selection may include identifying invariant features such as with respect to translation, rotation, and/or scale or sensor signals. Feature selection may include identifying robust features with respect to occlusion, distortion, deformation, and variations in environment.

The training application 744 may capture training data in the form of an input from the user [Step 1118]. In one embodiment, an application may provide an option that enables a user to input a condition vector into the database 900 associated with the current conditions of the media device. For example, whenever a user receives a call, once the call is completed, the user may be presented with the option to set a desired alert pattern associated with the conditions of the media device at the time when the call was received. In another embodiment, the decision application 702 allows a user to define or adjust element settings of known condition vectors. After pre-processing, feature extraction, and selection, the application 744 may then perform model learning and estimation whereby the application 744 learns to map between features and pattern groups and categories of sensor signals [Step 1126]. The application 744 may select a pattern recognition model that is parametric or non-parametric. The application 744 may select a type of model that include at least one of templates, decision-theoretic or statistical, syntactic or structural, neural, and hybrid forms of pattern recognition analysis [Step 1128].

Once a particular model is selected, the condition recognition application 742 performs a classification and/or matching of the received sensor signals and/or received condition vector using features and learned models from the condition training application 744 to assign the received condition vector to a category of patterns. The application 742 may then compare the received sensor signals and/or condition vector with the set of known condition vectors 800 in the database 900 to find the closest match between the received condition vector and the stored array of known condition vectors [Step 1112]. The application 742 may perform post-processing by evaluating its confidence in the decision [Step 1114]. The application 742 may then decide which input and/or output characteristic configuration of the database 900 corresponds to the received condition vector [Step 1116].

In certain embodiments, the features of the known condition vectors 800 may be limited to minimize costs in processing power and storage. Accordingly, the selectivity of identifying particular associated conditions of a media device may vary depending on the number of elements, points, or features stored or used for each known condition vector. In another embodiment, the known condition vector can be pre-generated and stored in the media device by the manufacturer or another entity.

The condition recognition application 742 may perform pattern recognition based on at least one of Bayes Decision Theory, Generative methods, discriminative methods, non-metric methods, algorithm-independent machine learning, unsupervised learning and clustering, and like techniques. The Bayes Decision techniques may include, without limitation, at least one of Bayes Decision Rule, minimum error rate classification, normal density and discriminant functions, error integrals and bounds, Bayesian networks, and compound decision theory. The Generative methods may include, without limitation, at least one of maximum likelihood and Bayesian parameter estimation, sufficient statistics, various common statistical distributions, dimensionality and computational complexity, principal components analysis, fisher linear discriminant, expectation maximization, sequential data, hidden Markov models, and non-parametric techniques including density estimation. The discriminative methods may include, without limitation, distance-based methods, nearest neighbor classification, metrics and tangent distance, fuzzy classification, linear discriminant functions (hyperplane geometry, gradient descent and perceptrons, minimum squared error procedures, and support vector machines), and artificial neural networks. The non-metric methods may include, without limitation, recognition with strings and string matching. The algorithm-independent machine learning techniques may include, without limitation, no-free lunch theorem, bias and variance, re-sampling for estimation, bagging and boosting, estimation of misclassification, and classifier combinations.

The media device may support input and/or output interfacing control for numerous applications including, without limitation, e-mail, texting, word processing, interface navigation, data searching, web surfing, database management, remote control systems, or any application operating with a media device.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow.

What is claimed is:

1. media device comprising:
a sensor for generating a sensor signal based on at least one current environmental condition associated with the media device,
a temporal source for generating a temporal signal associated with the media device, wherein the temporal signal includes at least one of a current time and a current date,
a data store for storing a plurality of known condition vectors in a condition vector database, wherein each known condition vector identifies an environmental condition and a temporal condition, and wherein at least one of the known condition vectors identifies a temporal condition that includes at least one of a time data field and a date data field, and
a processor for controlling an incoming call alert of the media device by assigning a first weight to the sensor signal and a second weight to the temporal signal, combining the weighted sensor and temporal signals to form a received condition vector, comparing the received condition vector with the stored plurality of known condition vectors, selecting a closest matching condition vector from the plurality of known condition vectors based on the received condition vector, and determining the incoming call alert of the media device based on the closest matching condition vector.

2. The device of claim 1, wherein the processor is to continuously compare the received condition vector with the plurality of known condition vectors prior to receiving an incoming call to determine the incoming call alert of the media device.

3. The device of claim 1, wherein the processor is to use a pattern recognition algorithm when comparing the received condition vector with the plurality of known condition vectors.

4. The device of claim 1, wherein the processor is to use a vector matching algorithm when comparing the received condition vector with the plurality of known condition vectors.

5. The device of claim 1, wherein the processor is to select the closest matching condition vector by applying a decision model, wherein the decision model includes at least one of a linear regression model, a non-linear regression model, a logistic regression model, a Bayesian network model, a Markov model, a fuzzy model, and a propensity score.

6. The device of claim 1, wherein the incoming call alert includes at least one of a vibration pattern, an audio pattern, a video display image, a light pattern, and a text output.

7. The device of claim 1, wherein the time data field of the temporal condition specifies a time range associated with normal work hours.

8. The device of claim 1, wherein the date data field of the temporal condition specifies a range of days in the week.

9. The device of claim 1, wherein at least one of the plurality of known condition vectors identifies an event condition.

10. The device of claim 9, wherein the event condition results from a user affecting at least one of a position, orientation, and movement of the media device.

11. The device of claim 1, wherein the sensor includes at least one of an accelerometer, a gyroscope, a light sensor, a temperature sensor, a pressure sensor, an infrared (IR) sensor, a proximity sensor, a capacitive proximity sensor, an acoustic sensor, an acoustic frequency sensor, a sonic or sonar sensor, a radar sensor, an image sensor, a video sensor, a global positional system (GPS) detector, a RF detector, a RF or acoustic Doppler detector, a RF triangulation detector, a video sensor, a battery charging sensor, and a peripheral device detector.

12. The device of claim 11, wherein the acoustic sensor includes a microphone.

13. A method for interfacing with a media device comprising:
storing a plurality of known condition vectors in a condition vector database, wherein each known condition vector identifies an environmental condition and a temporal condition, and wherein at least one of the known condition vectors identifies a temporal condition that includes at least one of a time of the day and a day of the week,
generating a sensor signal from a sensor based on at least one current environmental condition associated with the media device,
generating a temporal signal associated with the media device, wherein the temporal signal includes at least one of a current time and a current date,
assigning a first weight to the sensor signal and a second weight to the temporal signal,
combining the weighted sensor and temporal signals to form a received condition vector,
comparing the received condition vector with the stored plurality of known condition vectors,
selecting a closest matching condition vector from the plurality of known condition vectors based on the received condition vector, and
determining an incoming call alert of the media device based on the closest matching condition vector.

14. The method of claim 13, wherein comparing the received condition vector with the stored plurality of known condition vectors is repeated continuously prior to receiving an incoming call to determine the incoming call alert of the media device.

15. The method of claim 13, wherein comparing includes employing a pattern recognition algorithm.

16. The method of claim 13, wherein comparing includes employing a vector matching algorithm.

17. The method of claim 13, wherein selecting the closest matching condition vector includes applying a decision model, wherein the decision model includes at least one of a linear regression model, a non-linear regression model, a logistic regression model, a Bayesian network model, a Markov model, a fuzzy model, and a propensity score.

18. The method of claim 13, wherein the incoming call alert includes at least one of a vibration pattern, an audio pattern, a video display image, a light pattern, and a text output.

19. The method of claim 13, wherein at least one of the plurality of known condition vectors identifies an event condition.

20. The method of claim 19, wherein the event condition results from a user affecting at least one of a position, orientation, and movement of the media device.

* * * * *